United States Patent
Etzlstorfer et al.

(10) Patent No.: US 11,801,663 B2
(45) Date of Patent: Oct. 31, 2023

(54) METHOD FOR PRODUCING STEEL COMPOSITE MATERIALS

(71) Applicant: voestalpine Stahl GmbH, Linz (AT)

(72) Inventors: Christoph Etzlstorfer, Grünbach (AT); Alois Leitner, Weyregg am Attersee (AT); Reinhard Hackl, Gramastetten (AT)

(73) Assignee: VOESTALPINE STAHL GMBH, Linz (AT)

(*) Notice: Subject to any disclaimer, the term of this patent is extended or adjusted under 35 U.S.C. 154(b) by 580 days.

(21) Appl. No.: 16/614,485

(22) PCT Filed: May 17, 2018

(86) PCT No.: PCT/EP2018/063000
§ 371 (c)(1),
(2) Date: Nov. 18, 2019

(87) PCT Pub. No.: WO2018/211039
PCT Pub. Date: Nov. 22, 2018

(65) Prior Publication Data
US 2020/0094524 A1    Mar. 26, 2020

(30) Foreign Application Priority Data

May 18, 2017    (DE) ..................... 10 2017 110 851.3

(51) Int. Cl.
| | | |
|---|---|---|
| *B21B 47/00* | (2006.01) | |
| *B32B 15/01* | (2006.01) | |
| *C21D 8/02* | (2006.01) | |
| *C21D 9/00* | (2006.01) | |
| *C23C 2/06* | (2006.01) | |
| *C23C 2/12* | (2006.01) | |
| *C21D 1/26* | (2006.01) | |
| *C21D 1/673* | (2006.01) | |
| *C22C 38/00* | (2006.01) | |
| *C23C 10/00* | (2006.01) | |
| *C22C 38/02* | (2006.01) | |
| *C22C 38/04* | (2006.01) | |
| *C22C 38/06* | (2006.01) | |
| *C22C 38/22* | (2006.01) | |
| *C22C 38/28* | (2006.01) | |
| *C22C 38/32* | (2006.01) | |

(52) U.S. Cl.
CPC ............ *B32B 15/011* (2013.01); *B21B 47/00* (2013.01); *C21D 1/26* (2013.01); *C21D 1/673* (2013.01); *C21D 8/0205* (2013.01); *C21D 8/0226* (2013.01); *C21D 8/0236* (2013.01); *C21D 8/0257* (2013.01); *C21D 8/0273* (2013.01); *C21D 9/0062* (2013.01); *C22C 38/00* (2013.01); *C23C 2/06* (2013.01); *C23C 2/12* (2013.01); *C23C 10/00* (2013.01); *B32B 2250/02* (2013.01); *B32B 2250/03* (2013.01); *B32B 2250/04* (2013.01); *B32B 2250/05* (2013.01); *B32B 2311/30* (2013.01); *C21D 2211/001* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/28* (2013.01); *C22C 38/32* (2013.01)

(58) Field of Classification Search
CPC ...................................................... C21D 8/0226
See application file for complete search history.

(56) References Cited

U.S. PATENT DOCUMENTS

| | | | | |
|---|---|---|---|---|
| 4,046,304 A | * | 9/1977 | Tabata ............... | B23K 20/2275 228/262.44 |
| 11,401,574 B2 | * | 8/2022 | Ruthenberg ............. | C21D 9/46 |
| 2013/0189539 A1 | * | 7/2013 | Van De Langkruis ...................... | C22C 38/06 29/527.4 |
| 2016/0311197 A1 | * | 10/2016 | Becker ................... | C22C 38/38 |

FOREIGN PATENT DOCUMENTS

| | | |
|---|---|---|
| DE | 102013100580 A1 | 7/2014 |
| EP | 0596133 A1 * | 5/1994 |
| JP | H05212404 A | 8/1993 |
| WO | 2012048844 A1 | 4/2012 |
| WO | 2015090608 A1 | 6/2015 |

OTHER PUBLICATIONS

International Search Report and Written Opinion dated Jul. 30, 2018 for corresponding International Application No. PCT/EP2018/063000.
German Office Action dated Aug. 25, 2017 for priority German Application No. 10 2017 110 851.3.
Keskin, Aylin. Nachhaltige Konzepte für den Einsatz multipler Werkstoffe im Automobilbau. Diss. Hochschule für Angewandte Wissenschaften Hamburg, 2017. English: (Sustainable concepts for the use of multiple materials in the automotive industry. University of Applied Sciences Hamburg).

(Continued)

Primary Examiner — Jophy S. Koshy
(74) Attorney, Agent, or Firm — TAROLLI, SUNDHEIM, COVELL & TUMMINO L.L.P.

(57) ABSTRACT

The invention relates to a method for producing a steel composite in which at least two steel sheets that consist of different steel grades are placed against each other, hot rolled together, and then possibly cold rolled and in which after the rolling, the composite material, which is thus produced from at least two layers with different steel compositions, is diffusion annealed, wherein the annealing temperature is set so as to select the chemical potential of the steel materials to correspond to the following equation:

$$\mu_{C, material\ 1} > \mu_{C, material\ 2},$$

where material 1 has a lower carbon content than material 2 so that an uphill diffusion of carbon takes place between material 1 and material 2.

5 Claims, 21 Drawing Sheets

(56) References Cited

OTHER PUBLICATIONS

Thyssenkrupp Steel Europe AG: „tribond Product information for high-strength and high ductile steel composite Mar. 2016, https://www.thyssenkrupp-steel.com/media/content_1/publikationen/thyssenkrupp_tribond_product_information_steel_en.pdf.
Thyssenkrupp Stell Europe Ag: "TRIBOND—hochfest und hochduktil Massgenschneiderter Werkstoff für die Warmumformung" Oct. 1, 2015.

* cited by examiner

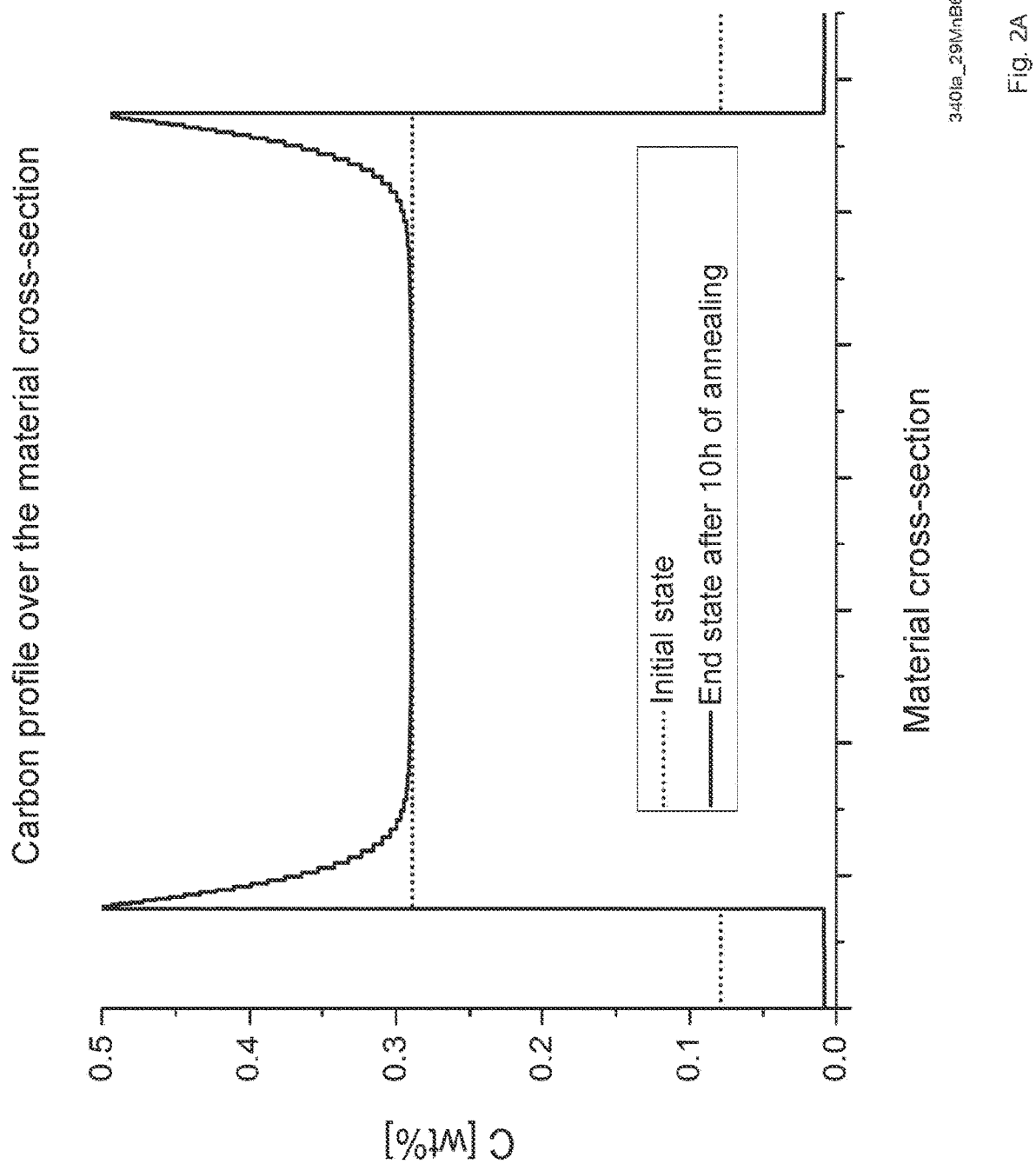

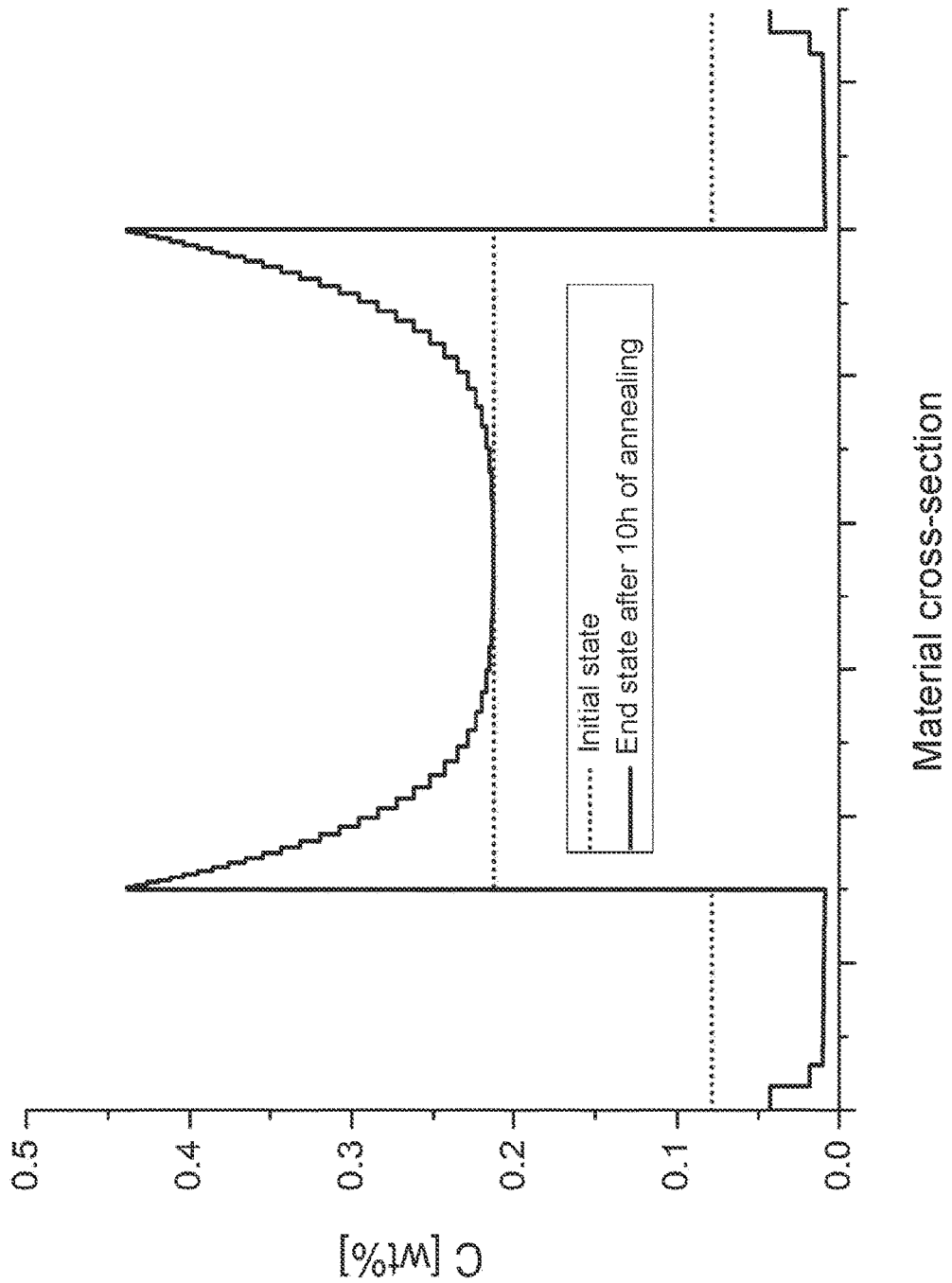

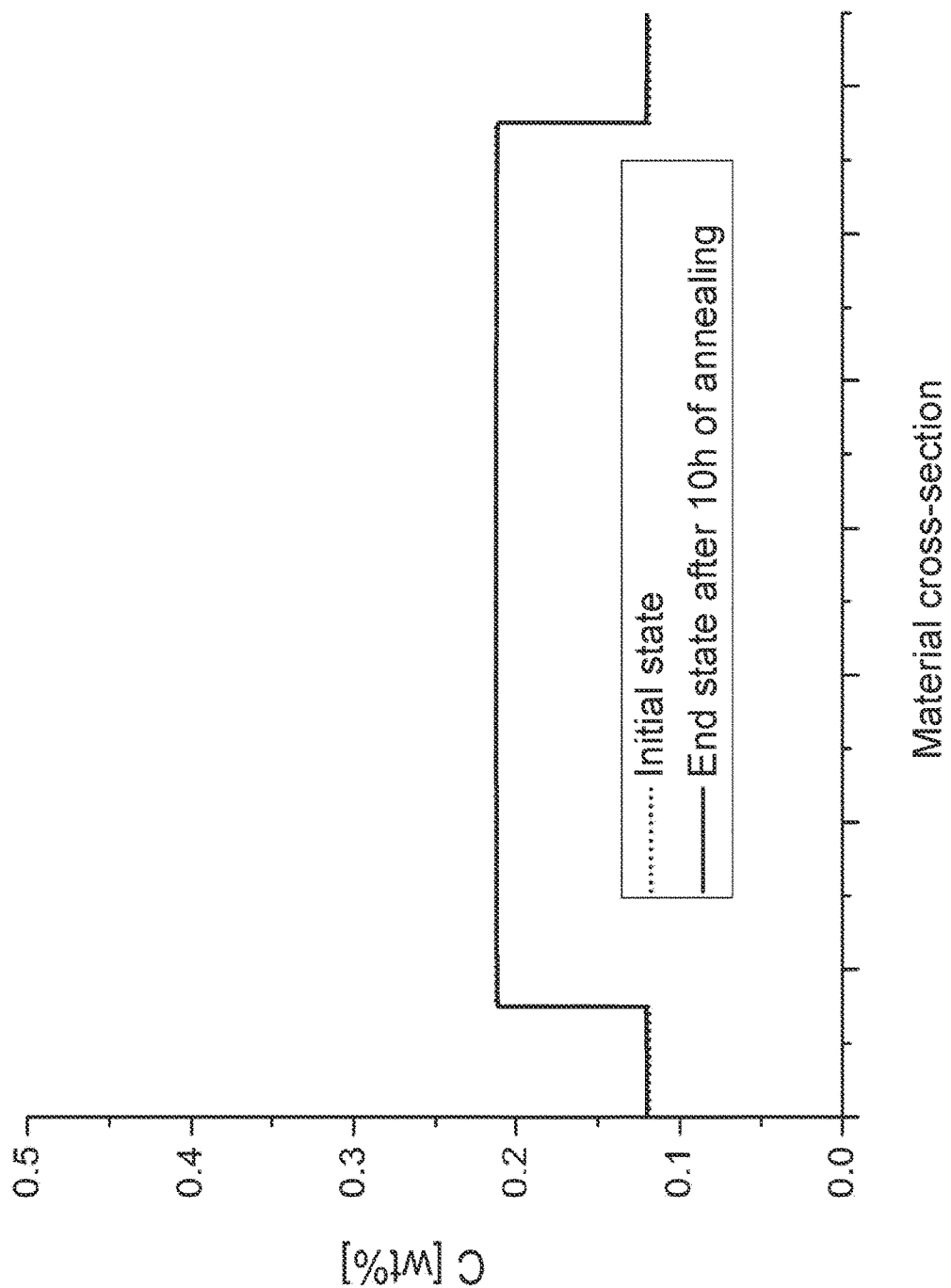

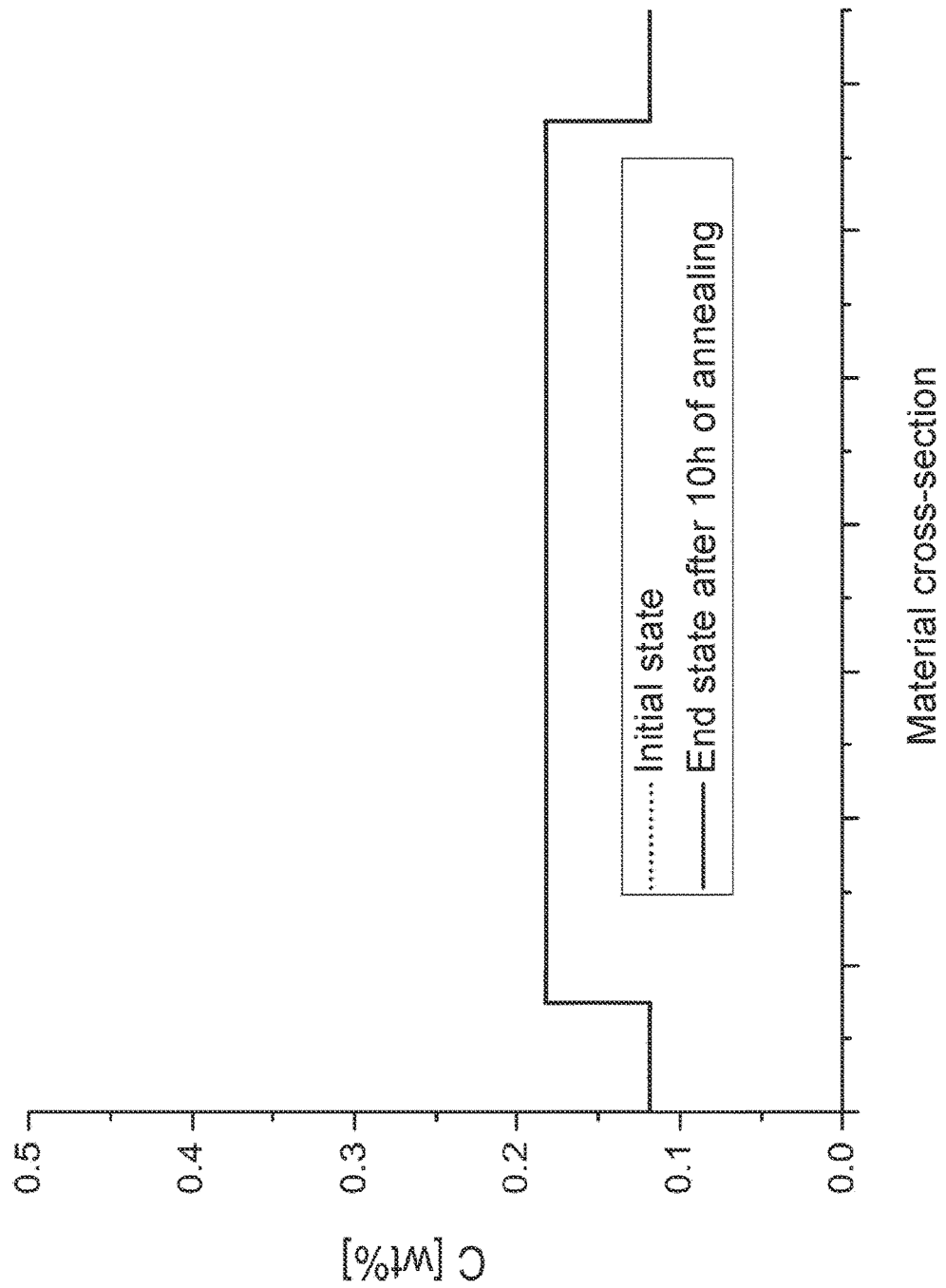

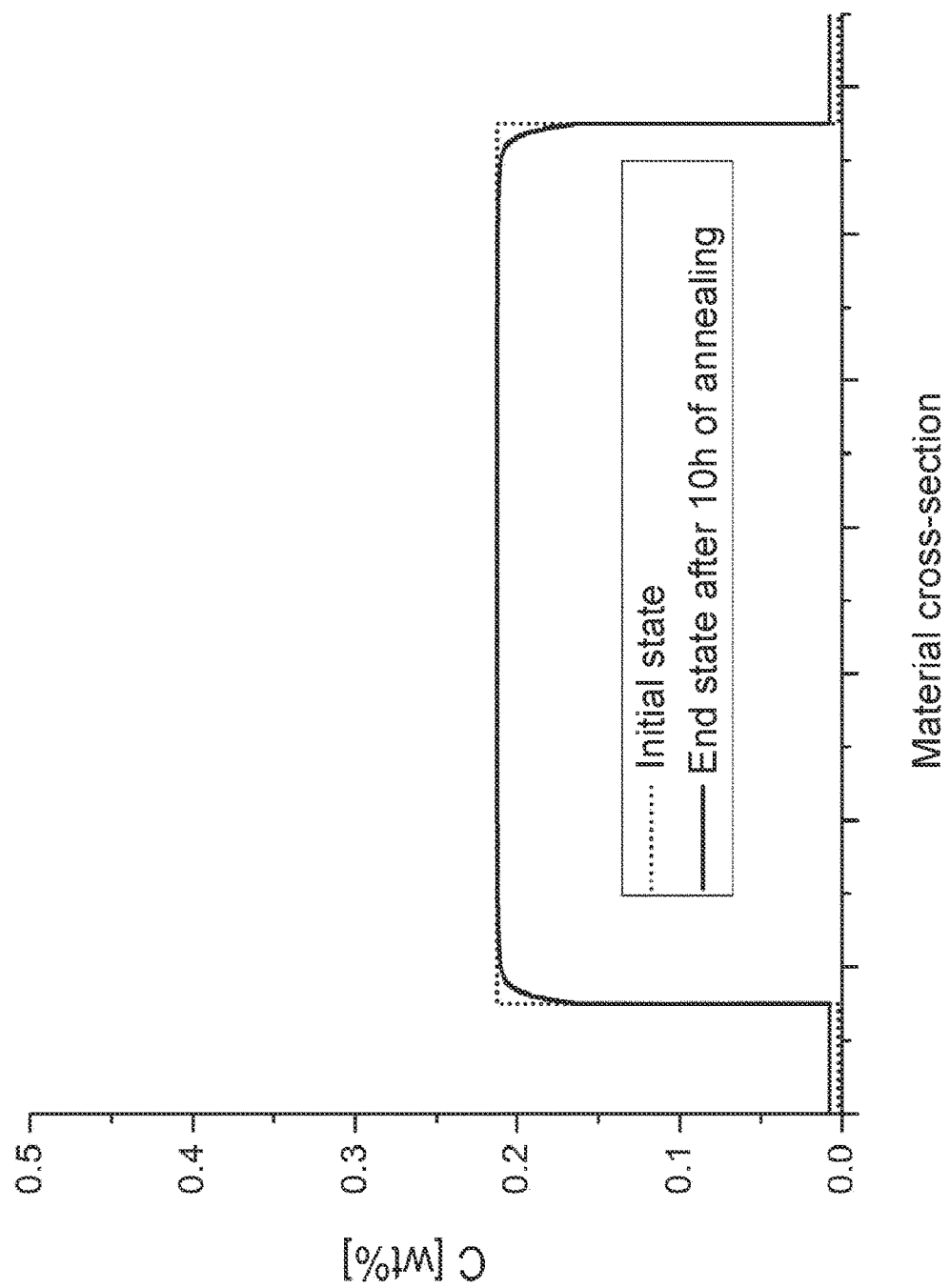

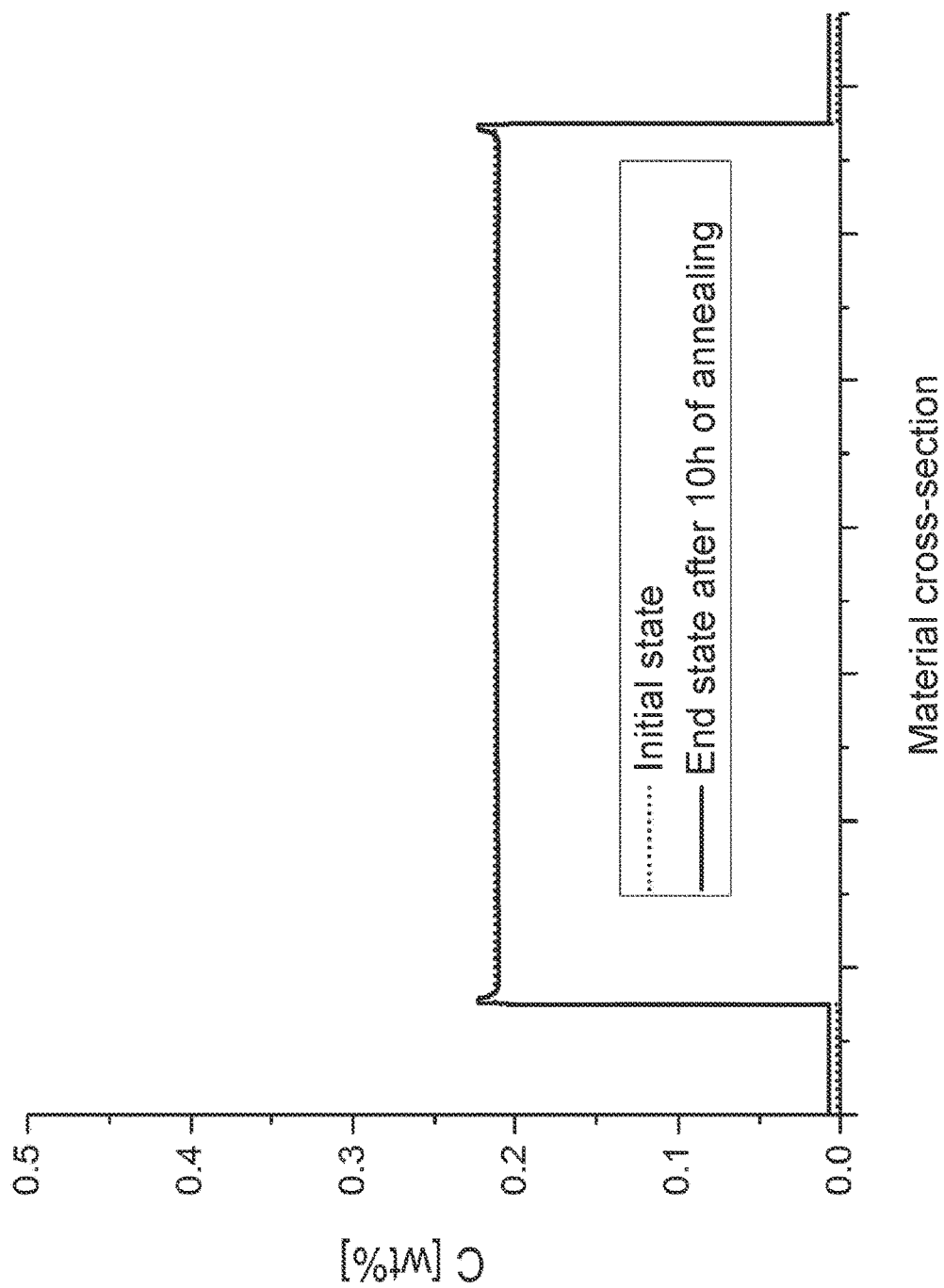

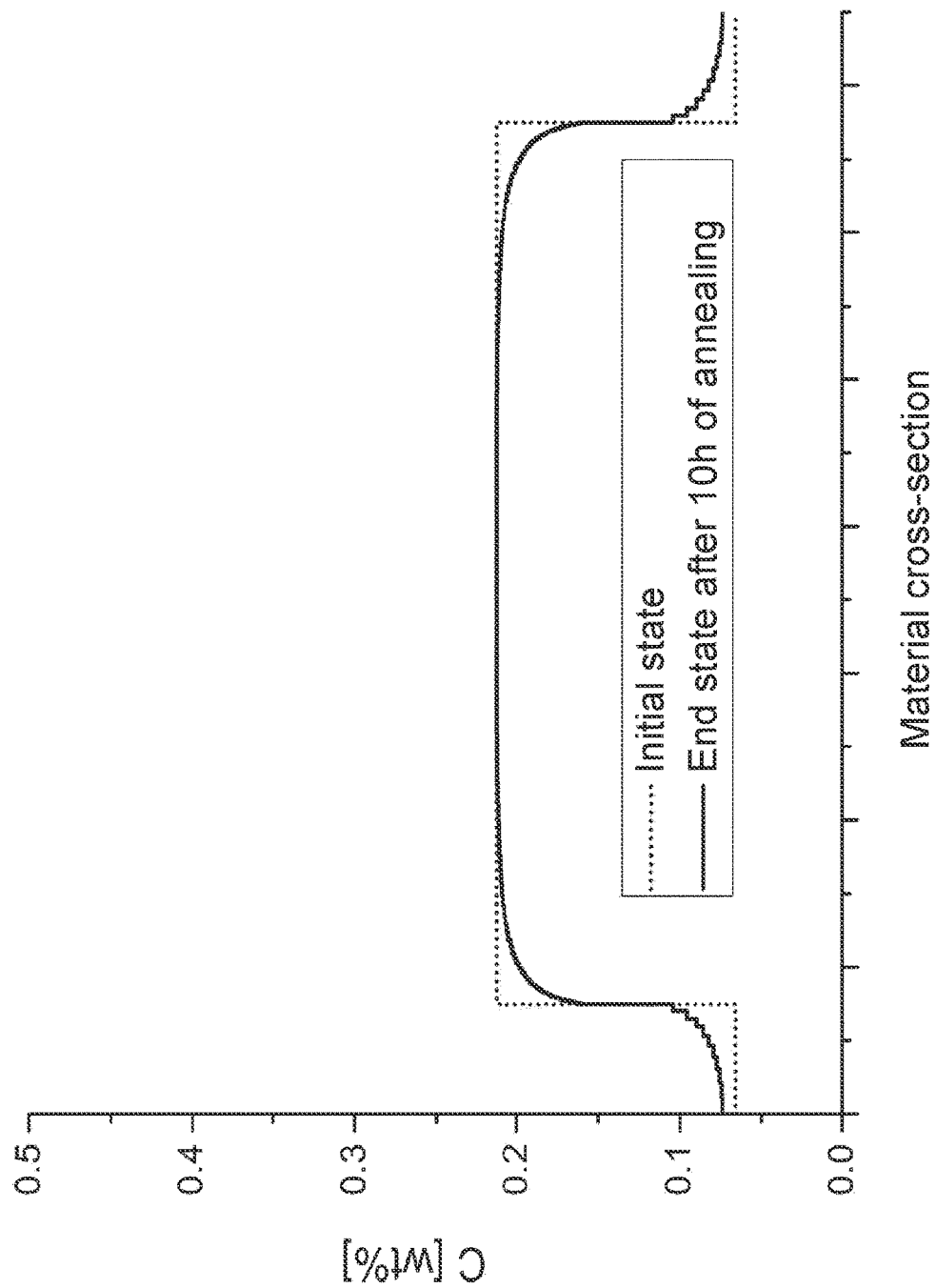

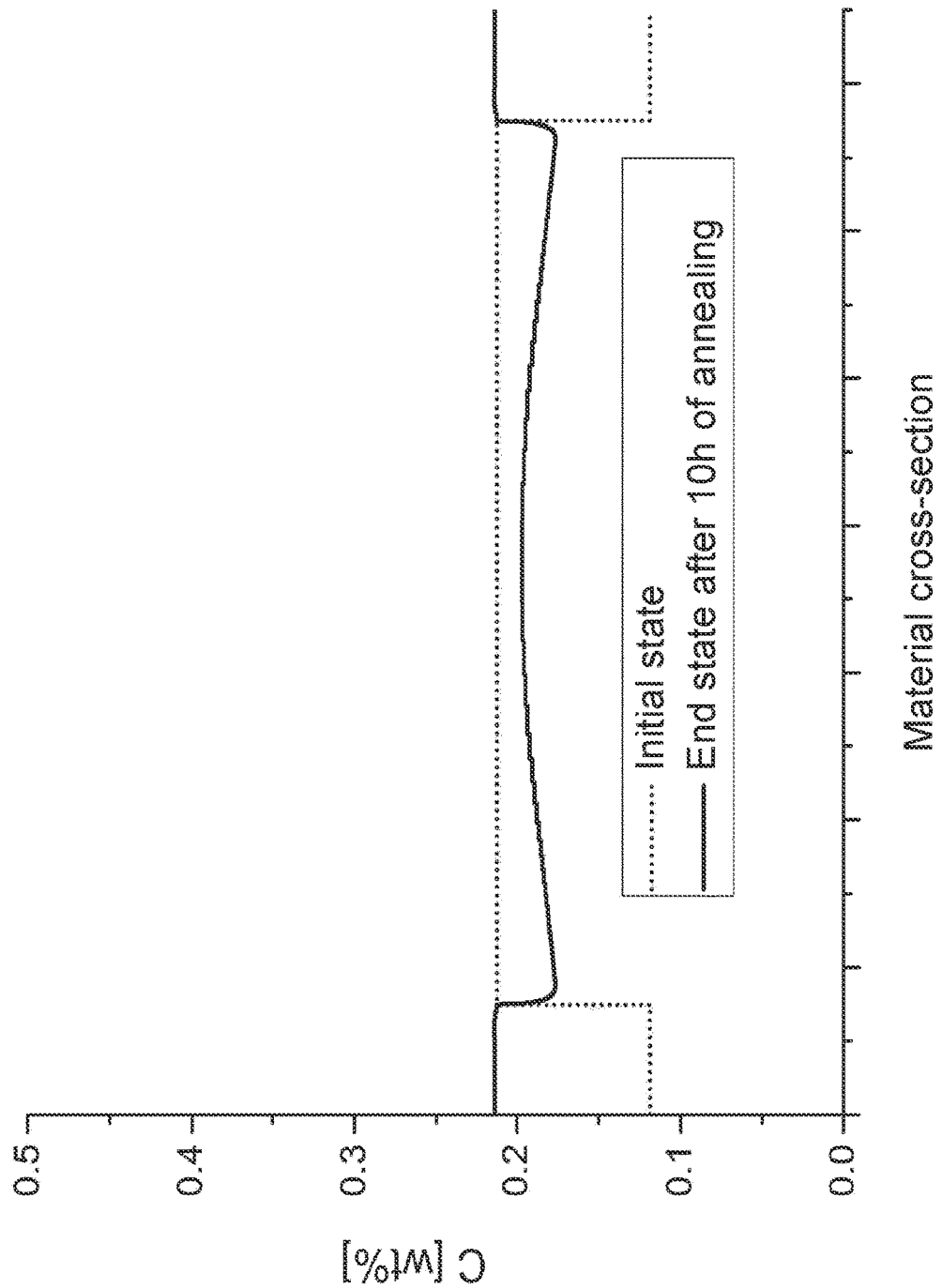

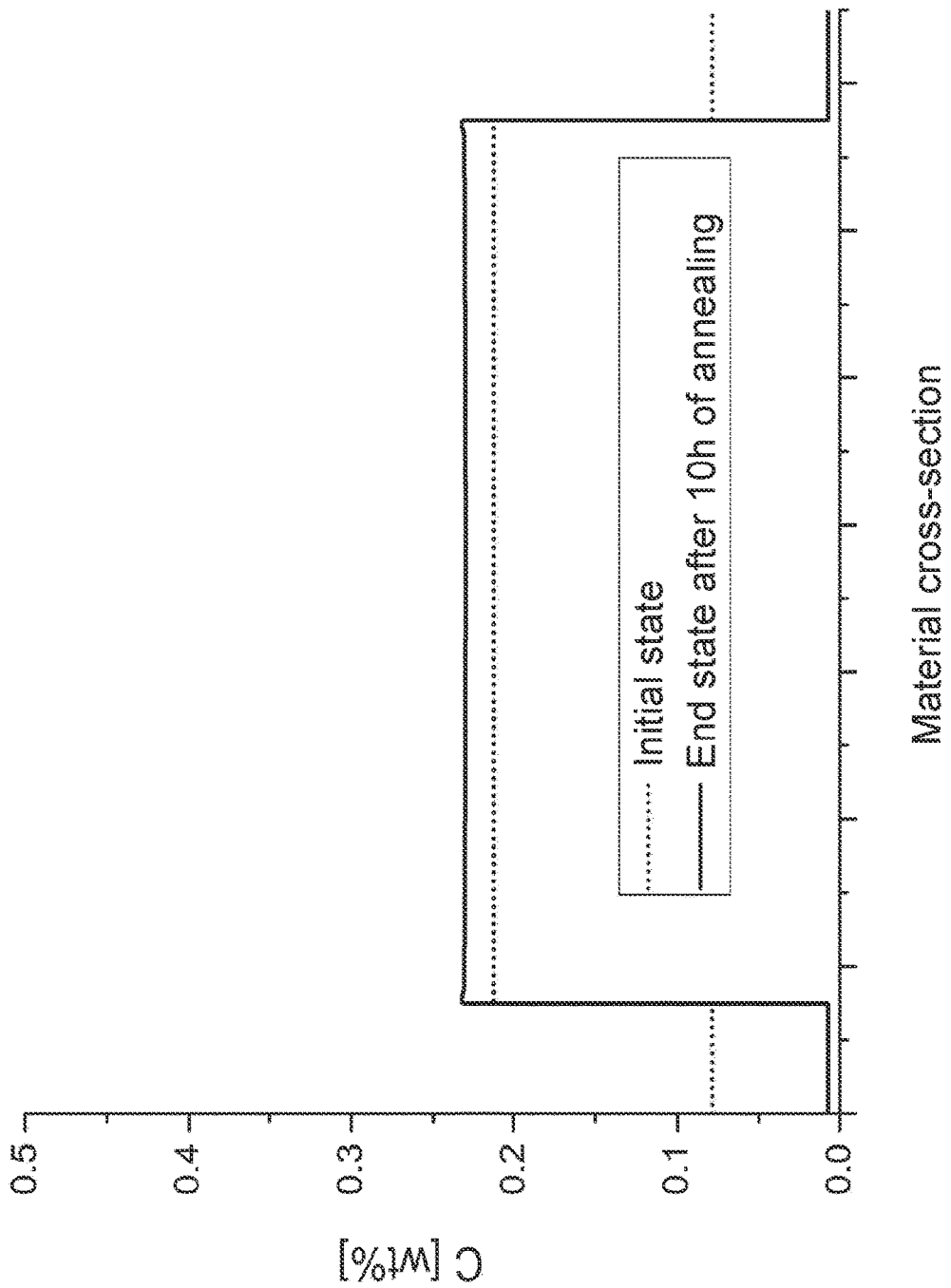

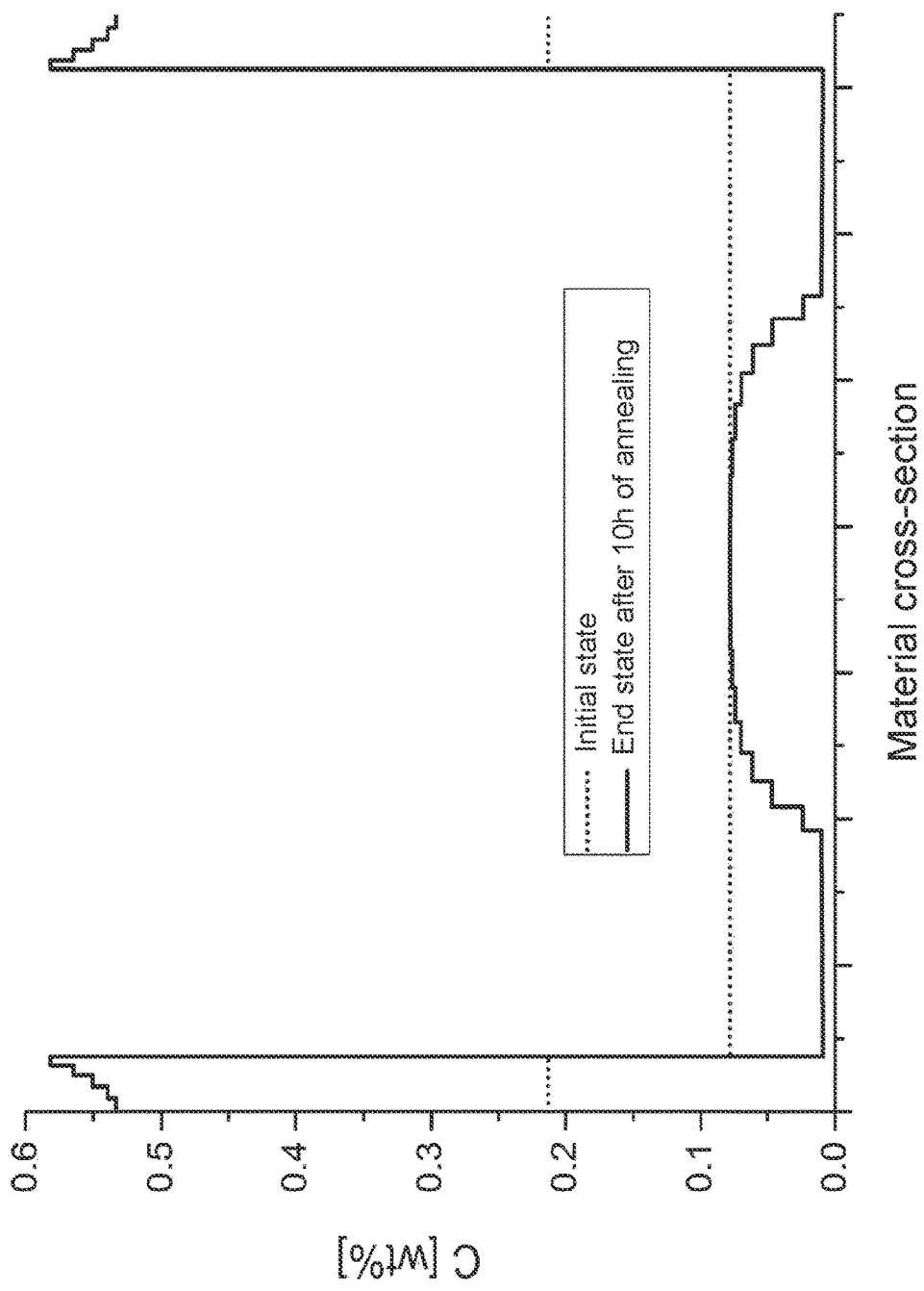

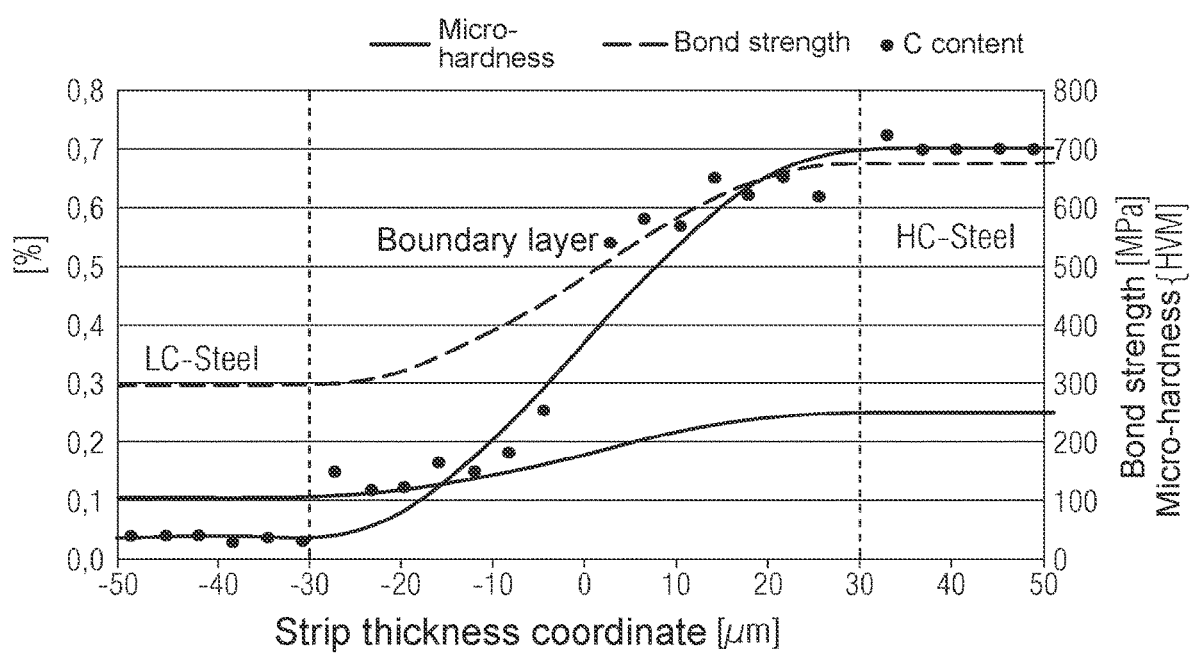
FIG. 3C(1)

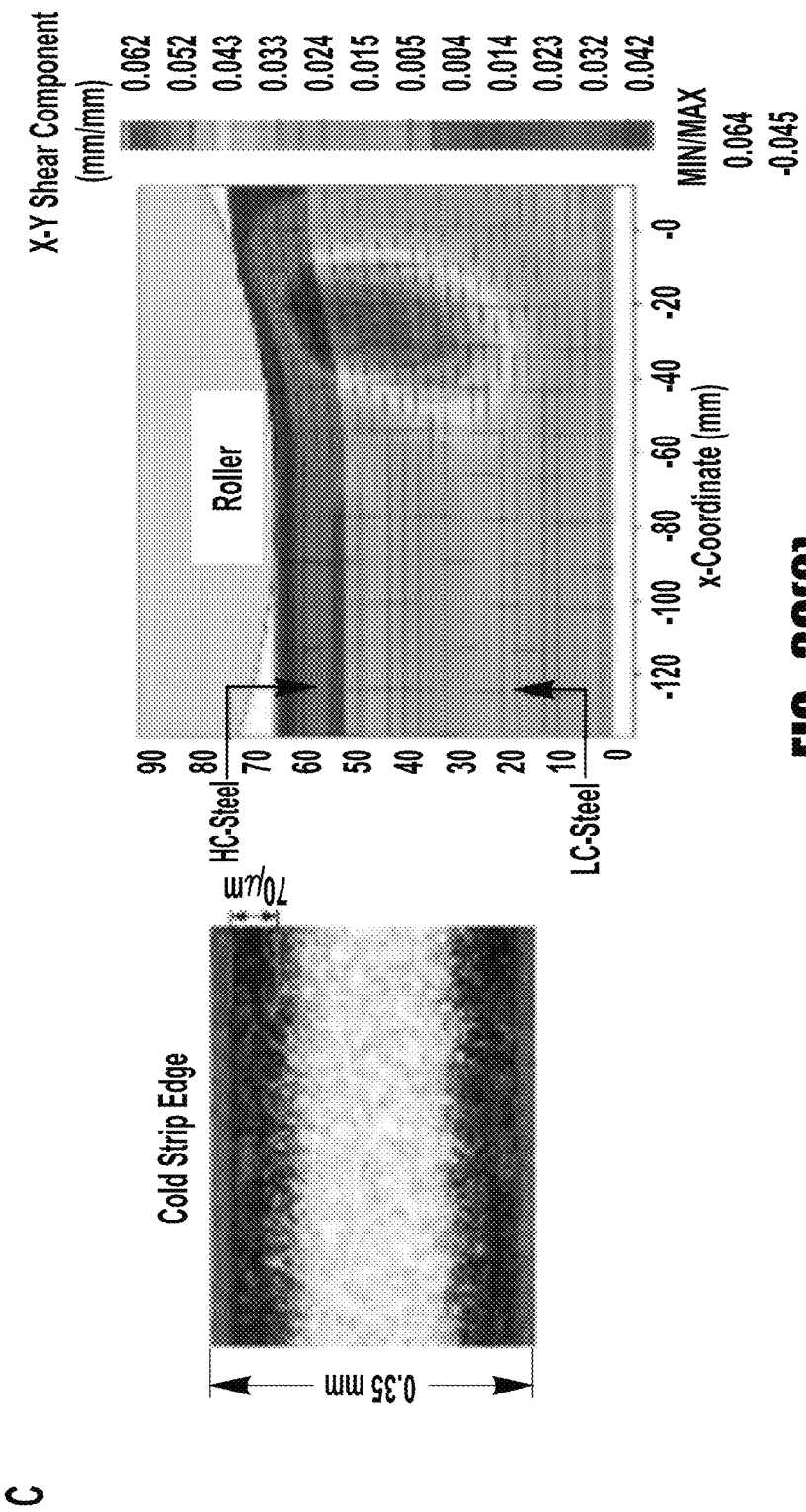
FIG. 3C(2)

METHOD FOR PRODUCING STEEL COMPOSITE MATERIALS

RELATED APPLICATIONS

The present application is a U.S. National Stage application under 35 USC 371 of PCT Application Serial No. PCT/EP2018/063000, filed on 17 May 2018; which claims priority from DE Patent Application No. 10 2017 110 851.3, filed 18 May 2017, the entirety of both of which are incorporated herein by reference.

The invention relates to a method for producing steel composite materials.

Hardened steel components, particularly in body construction of motor vehicles, have the advantage that due to their outstanding mechanical properties, it is possible to construct a particularly stable passenger cell without having to use components that at normal strengths would be embodied as much more massive and thus heavier.

Hardened steel components of this kind are produced using steel types that can be hardened by means of a quench hardening. Such steel types are, for example, boron-alloyed manganese carbon steels, with the most commonly used here being 22MnB5. But other boron-alloyed manganese carbon steels are also used for this purpose.

In order to produce hardened components from these steel types, it is necessary to heat the steel material to the austenitization temperature ($>Ac_3$) and wait until the steel material is austenitized. Depending on the desired degree of hardness, it is possible here to achieve partial austenitizations or full austenitizations.

If after the austenitization, such a steel material is cooled at a speed greater than the critical hardening speed, then the austenitic structure transforms into a martensitic, very hard structure. In this way, it is possible to achieve tensile strengths $R_m$ of up to more than 1500 MPa.

Currently, there are two customary processing approaches for producing steel components. In so-called form hardening, a steel sheet blank is detached from a steel strip, for example cut out or stamped from it, and then deep drawn to produce the finished component in a conventional, for example five-stage, deep drawing process. The finished component in this case is dimensioned somewhat smaller in order to compensate for a subsequent thermal expansion during the austenitization.

The component produced in this way is subsequently austenitized and then inserted into a form hardening tool in which it is pressed, but not formed—or formed only very slightly—and by means of the pressing, the heat flows from the component into the pressing tool, specifically at a speed greater than the critical hardening speed.

The other processing approach is so-called press hardening in which a blank is detached from a sheet steel strip, for example cut out or stamped from it, then the blank is austenitized and the hot blank is formed in a preferably single-stage step and simultaneously cooled at a speed greater than the critical hardening speed.

In both cases, it is possible to use blanks provided with metallic anti-corrosion coatings e.g. with zinc or an alloy based on zinc. Form hardening is also referred to as the indirect process and press hardening is referred to as the direct process. The advantage of the indirect process is that it is possible to achieve more complex tool geometries.

The advantage of the direct process is that a higher degree of material utilization can be achieved. But the achievable component complexity is lower, especially with the one-stage forming process.

Consequently, in form hardening, completely formed and usually also completely perforated components are conveyed through a furnace and heated to the austenitization temperature. For the transport, these components are placed on furnace carriers.

In press hardening, the blanks must be conveyed through the furnace by means of chain conveyors or walking beams.

It is also known to produce such form-hardened or press-hardened components with zones that have different properties. In this connection, it is customary, for example, to not heat certain regions of the blank or component to the austenitization temperature so that these regions are also not hardened in the subsequent quenching. It is thus possible to produce zones with a lower hardness and higher ductility.

It is known to produce such softer zones by applying absorption masses, shielding these regions from thermal radiation, or not subjecting these regions to an additional thermal radiation.

These are so-called tailored property parts (TPP).

It is also known to produce components with different regions in that different steel grades, i.e. for example steel grades that can be hardened with a form hardening process or a press hardening process, are combined with steel grades that for example cannot be hardened or cannot be hardened as highly.

Such components, which are also referred to as tailor welded parts (TWP), consist, for example, of a boron-manganese steel that can be hardened in a form hardening process or press hardening process, for example a 22MnB5, as well as a microalloyed steel and other steels that exhibit a different behavior in terms of the hardening than highly hardenable steels.

It is also known to also achieve different properties by means of different sheet thicknesses so that a press-hardened or form-hardened component has zones with different sheet thicknesses and thus also different properties. Regions with different sheet thicknesses in this case can also be manufactured of different steel grades so that a thinner region consists of a first steel grade and a thicker region consists of a second steel grade; the two regions can also consist of one and the same steel grade.

As stated above, there are many possibilities for influencing the ductility across the width and length of a component.

In the past, however, consideration has also been given to how different properties can also be adjusted across the thickness of a component.

In particular, it is desirable to influence the outer edge zones of steel sheets while the core retains the usual properties. With conventional steel processing methods, this is possible, for example, by performing an edge carburization in which carbon is diffused into a workpiece from the outside so that depending on the carbon content, the edges can be more intensely hardened or a decarburization—which has taken place due to processing, in particular thermal treatment—can be equalized again by means of this.

In order not to make such edge zones harder, but rather softer, i.e. more ductile, for subsequent forming processes, an edge decarburization can be provided. With these carburization and decarburization processes, however, the corresponding temperature guidance and the corresponding gas guidance must be ensured in a relatively complex way.

This is naturally also possible with steel sheets or steel strips, but then the surfaces of the steel strip would have to be correspondingly treated in a continuous process.

It is also known to embody a steel sheet as a composite, where the outer surfaces consist of a different steel grade than the core. To accomplish this, three sheets, for example in an A-B-A sequence, are rolled onto one another, where A stands for steel grades that are positioned on the outer surface of the finished steel strip and B stands for a steel grade that is embedded between the two outer steel grades.

For this purpose, the company ThyssenKrupp has disclosed corresponding sandwich structures known by the name of BP3 metal-to-metal composites; the outer sheets are high carbon steels while the inner steel sheet is a so-called low carbon steel. Also, with the reverse composition, this product is known by the brand name Tribond®.

In this connection, it has been possible to observe the fact that the carbon diffuses from the higher carbon material into the lower carbon material.

Such a diffusion behavior is naturally disadvantageous because it would result in the fact that during a heat treatment and subsequent roller treatment, the carbon contents and thus the hardnesses equalize.

The high carbon content in one of the layers also results in a more difficult processing during manufacture, in this case, particularly during the cold rolling.

The object of the invention is to create a method with which a steel composite material, which is particularly suitable for press hardening and form hardening, is produced, in which the properties of different layers do not equalize and are set only after a comparatively simple manufacture.

The object is attained with a method having the features of claim 1.

Advantageous modifications are characterized in the dependent claims that depend on this claim.

It has been discovered that under quite particular conditions, a diffusion from the carbon-poorer material into the carbon-richer material and thus a carbon-poorer outer layer can be embodied as even more ductile, while an inner layer can be embodied as even harder in the edge zones. This diffusion in opposition to the concentration gradient is also referred to as "uphill diffusion" below. Through suitable material combinations and heat treatments, it is thus possible to produce a composite material with significantly different properties. According to the invention, it has been discovered that the behavior, which is to be taken advantage of here, is significantly dependent on the chemical potential for carbon $\mu_c$ of the respective steel grade. The chemical potential p is thermodynamic state variable introduced by Josiah Gibbs, with a unit of J/mol, i.e. the work per quantity of the material.

The potential or chemical potential between materials has a tendency to equalize so that a diffusion process occurs spontaneously if the chemical potential at the start is greater than the chemical potential at the end ($\mu_{start} > \mu_{end}$).

According to the invention, the steel compositions are selected independently of the carbon content so as to enable an uphill diffusion of carbon, i.e. in opposition to the concentration gradient. The potential on the whole and for one element is determined by the structure of the steel, additional materials, and the temperature. The diffused element per se, however, has the greatest influence on the potential so that an uphill diffusion is generally difficult to achieve. In the present case, the potential for carbon is increased by manganese, titanium, and chromium, while it is reduced by silicon. Other elements exert different influences on the chemical potential for carbon depending on the temperature (e.g. aluminum, molybdenum, nickel) and alloy percentage (boron, molybdenum).

The chemical potential of a steel alloy can be calculated using modern software for alloy compositions (e.g. MatCalc® or Thermocalc®).

According to the invention, it has therefore turned out that the possible edge materials should have a relatively low percentage of carbon in order to improve the processability, i.e. the ductivity [sic] in the edge region. These should contain little manganese and chromium and the loss of carbon should have little influence on the strength of the material. Furthermore, it is useful if the edge material contains few alloying elements and is thus a so-called microalloyed steel. Steels of the following qualities have turned out to be suitable materials: 340LA; 420LA; and under certain circumstances 500LA.

IF and ULC steels, austenitic steels, and stainless steels (rustproof steels) are not suitable for this purpose.

In particular, steels with the following compositions and element ranges are suitable:

Consequently, highly hardenable manganese-containing steels of this alloy composition are suitable for the invention (all indications in mass-%):

| C [%] | Si [%] | Mn [%] | P [%] | S [%] | Al [%] | Cr [%] | Ti [%] | B [%] | N [%] |
|---|---|---|---|---|---|---|---|---|---|
| 0.20 | 0.18 | 2.01 | 0.0062 | 0.001 | 0.054 | 0.03 | 0.032 | 0.0030 | 0.0041 | and residual iron and smelting-related impurities, wherein in particular, the alloy elements boron, manganese, carbon, and optionally chromium and molybdenum are used as transformation retarders in such steels.

In particular, steels of the following general alloy composition are suitable for the invention (all indications in mass-%):

| | |
|---|---|
| carbon (C) | 0.08-0.6 |
| manganese (Mn) | 0.8-3.0 |
| aluminum (Al) | 0.01-0.07 |
| silicon (Si) | 0.01-0.5 |
| chromium (Cr) | 0.02-0.6 |
| titanium (Ti) | 0.01-0.08 |
| nitrogen (N) | <0.02 |
| boron (B) | 0.002-0.02 |
| phosphorus (P) | <0.01 |
| sulfur (S) | <0.01 |
| molybdenum (Mo) | <1 | and residual iron and smelting-related impurities.

In particular, the following steel compositions have turned out to be suitable (all indications in mass-%):

| | |
|---|---|
| carbon (C) | 0.08-0.30 |
| manganese (Mn) | 1.00-3.00 |
| aluminum (Al) | 0.03-0.06 |
| silicon (Si) | 0.01-0.20 |
| chromium (Cr) | 0.02-0.3 |
| titanium (Ti) | 0.03-0.04 |
| nitrogen (N) | <0.007 |

-continued

|  |  |
|---|---|
| boron (B) | 0.002-0.006 |
| phosphorus (P) | <0.01 |
| sulfur (S) | <0.01 |
| molybdenum (Mo) | <1 | and residual iron and smelting-related impurities.

So-called microalloyed steels are suitable as a partner material for the abovementioned highly hardenable boron-manganese steels; a sample alloying window for these microalloyed steels looks like the following (here as well, indications are in mass percent):

|  |  |
|---|---|
| carbon (C) | 0.02-0.12 |
| manganese (Mn) | 0.2-1.2 |
| aluminum (Al) | 0.01-0.07 |
| silicon (Si) | <0.5 |
| chromium (Cr) | <0.3 |
| titanium (Ti) | 0.01-0.15 |
| nitrogen (N) | <0.02 |
| boron (B) | <0.02 |
| phosphorus (P) | <0.01 |
| sulfur (S) | <0.01 |
| molybdenum (Mo) | <1 |

With regard to the combinability of the steel materials and the annealing temperatures, according to the invention, only one material combination is used in which the desired potential gradients are present between the materials used at the edge and the material used in the core.

In this case, the annealing temperature must be selected so that comparable diffusion lengths are achieved. To do so, it is necessary to have similar structures. It has turned out that it is useful to set high diffusion values for carbon, but not for the lattice atoms. The annealing temperatures are thus particularly suitable when they are high enough that the material is still ferritic, i.e. just below $A_{C_1}$ of the respective steel alloy. With conventional boron-alloyed steels and microalloyed steels, these are temperatures between 670 and 700° C.

With such an annealing temperature and the corresponding potential gradient, a very clear boundary in the carbon distribution is achieved between the steel types used, i.e. the outer material is very powerfully depleted of carbon in the direction toward the inner material, while directly at the boundary between the outer material and the inner material, the inner material has a very high carbon content. If this is not desirable or if the carbon distribution should be somewhat more harmonious or more continuous, then it is also possible to select a higher temperature or to carry out the annealing for a longer time. Prior temperature treatments also influence the annealing process.

For a more continuous transition, the temperature treatment can also be set to a temperature above AC1; it has turned out, however, that the chemical potential for C usually reverses before AC3 and consequently, uphill diffusion no longer takes place. There is thus an upper limit of approx. 850° C., depending on the exact alloy composition of the two starting materials.

At the above-mentioned temperatures, it is generally useful to select a potential difference of at least 500 J/mol, preferably 1000 J/mol, more preferably 2000 J/mol, in order to achieve an appreciable diffusion.

With regard to the thickness ratios and thickness ranges, the two outer sheets should each be at most 25%, preferably less than 10%, particularly preferably less than 5%, of the total composite thickness.

The effect of the decarburization or carburization is mostly in the outer region of the composite and is preferably distinguished by the fact that the entire thickness of the outer sheet is decarburized or carburized in a correspondingly consistent way.

In this connection, the annealing duration for the complete diffusion correlates with thickness of the composite; it is noted that first, the completely rolled composite is correspondingly diffusion annealed.

The entire composite has a thickness of between 0.5 and 5 mm, preferably from 0.5 to 3 mm. In this case, a decarburization layer on the outside is 0.7 to 2 mm thick and a carburization layer on the outside is 0.5 to 1.5 mm thick.

With the invention, it is advantageous that by setting the chemical potential of the outer layer and a core layer or inner layer on the one hand and the appropriate annealing temperatures on the other, an uphill diffusion is achieved, which results in the fact that the edge layers are decarburized in favor of the central layer.

Naturally, the above-described A-B-A structure can also be reversed to B-A-B.

This means that under the above-mentioned conditions, the edges are carburized, i.e. become harder, and in the middle, a material is used that has a tendency to release its carbon to the outer layers. This would achieve a material that is more ductile at the core and is harder in the outer regions.

The invention will be explained by way of example based on the drawings. In the drawings:

FIGS. 3a-3c show a three-layer sheet structure according to the prior art with the corresponding carbon distribution.

FIGS. 3a to 3c show that in the prior art, a material was produced having thin outer regions that consist of a high carbon steel material while the inner region consists of a so-called low carbon steel.

In this case, the edge regions each make up about 10% of the thickness while the central region makes up about 80% of the thickness.

Figure 3A:
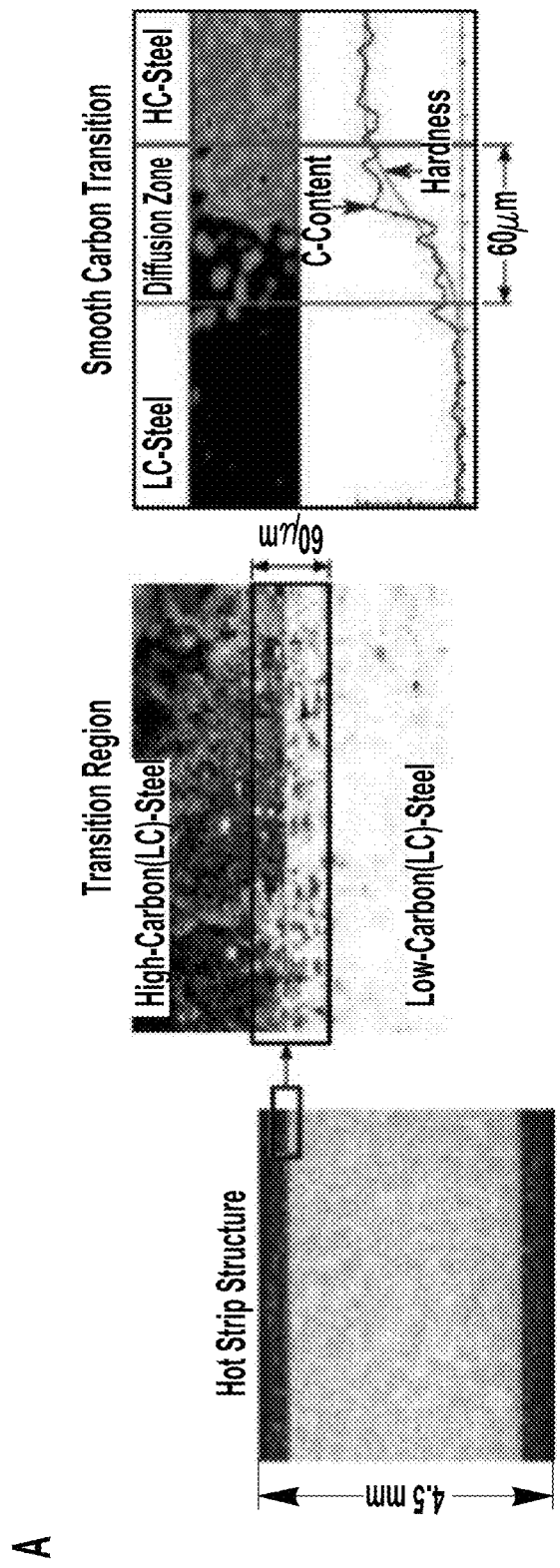
Figure 3B:
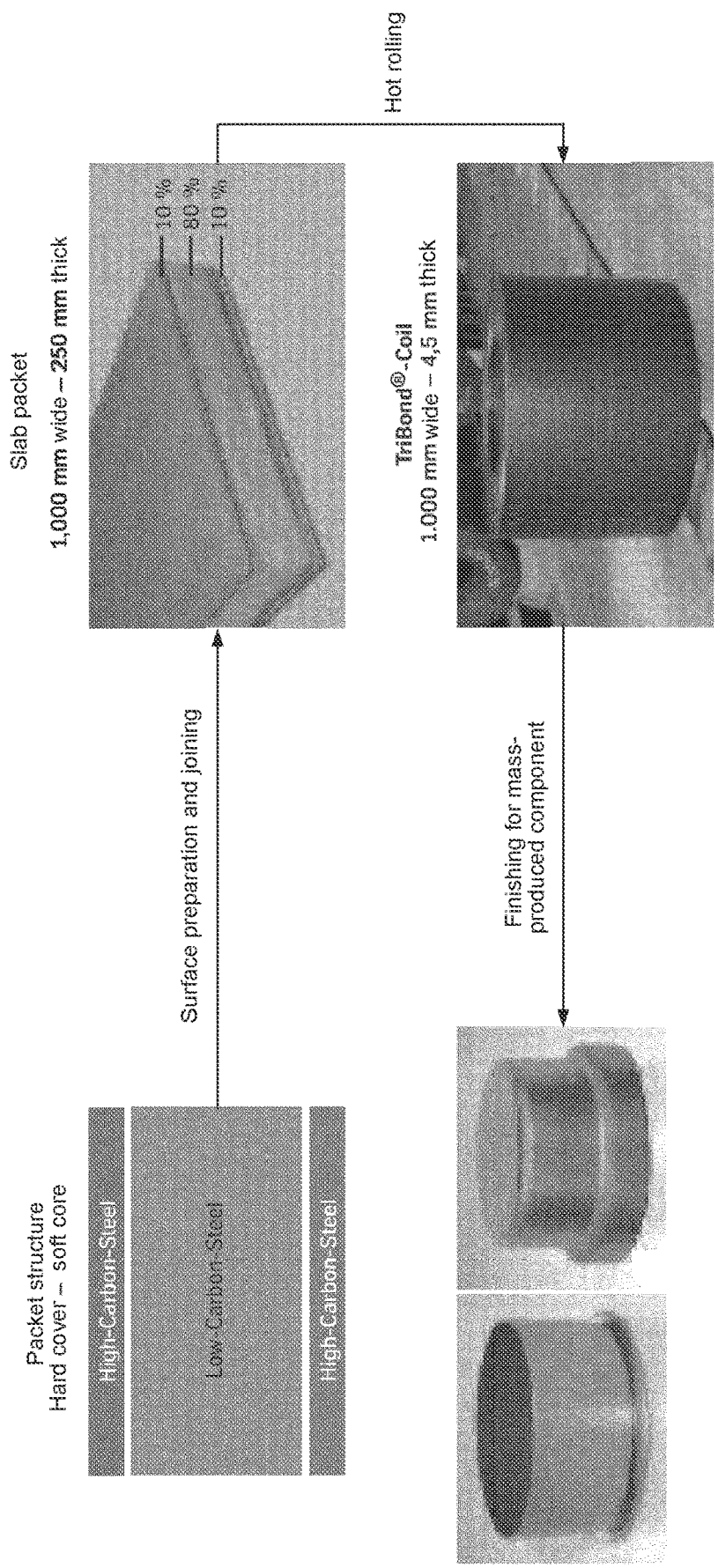

FIG. 3a shows the expected carbon diffusion between the high carbon steel in the edge region and the low carbon steel in the inner region; over a width of 60 micrometers, a carbon drop and thus also a hardness drop can be observed.

In embodiments according to the invention (FIGS. 2a-2p), it is clear that for example with a material pairing of 340LA on the outside and 29MnB6 on the inside, the carbon content in the initial state (dotted lines) shows a sharply defined difference, with the carbon content in the core region being approximately three times as high as in the edge region.

Figure 2B:
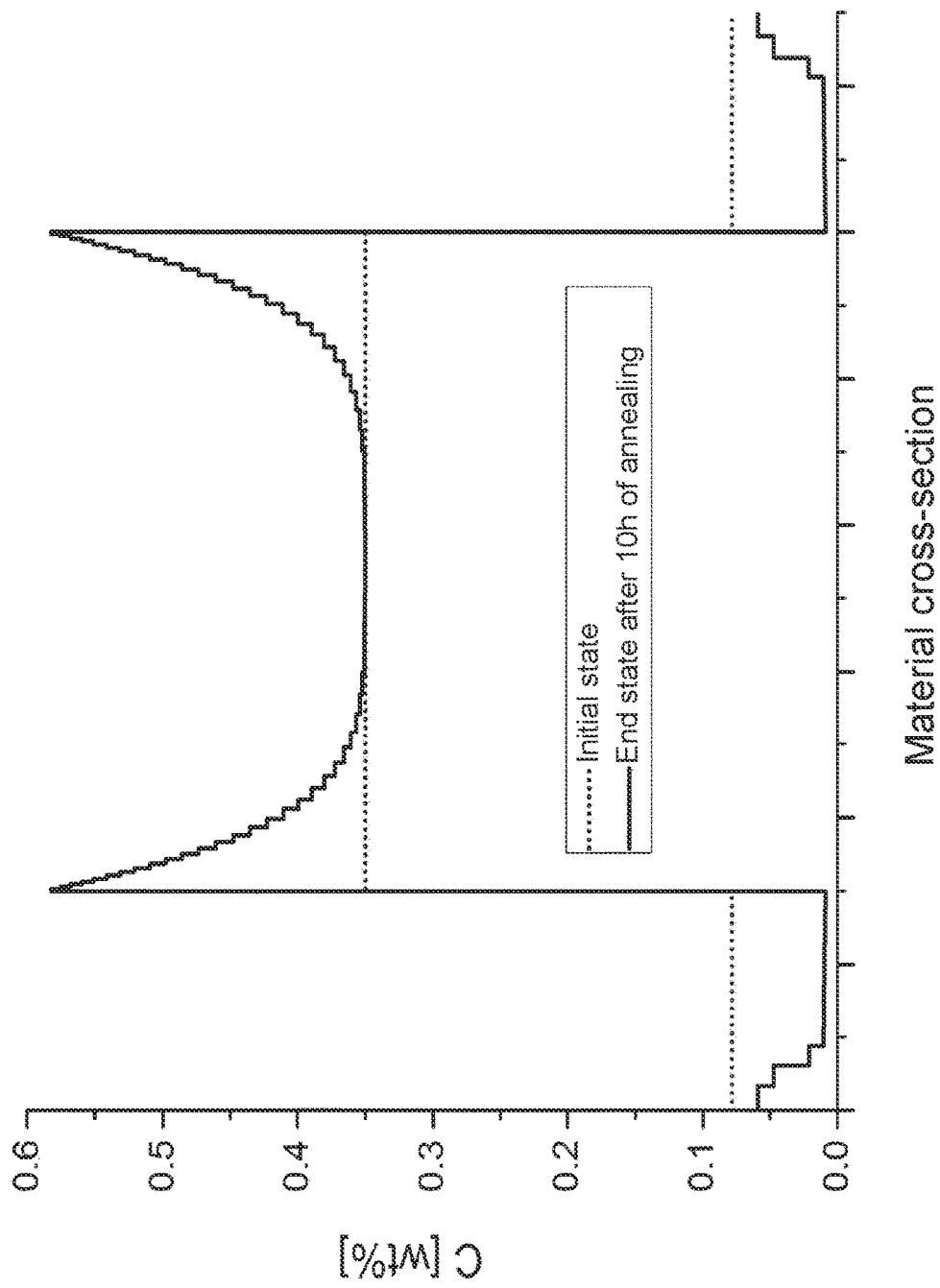
FIGS. 2a-2p show the carbon distribution in composite materials according to the invention in the initial state and after the annealing treatment according to the invention.

After this material is rolled and has been annealed in the coil at 680° C. for 10 hours, this yields the values shown with the solid lines. It is clear that the edge regions are almost completely decarburized while the carbon content in the edge region of the central material has nearly doubled and then falls toward the inside. The carbon has thus diffused uphill from the carbon-poorer material into the carbon-richer material. The diffusion behaves the same, but in a somewhat weaker way with different material combinations (FIGS. 2c and 2b), in which the same annealing was performed, but the inner material was changed to 34MnB5 (FIG. 2b) and 22 MnB5 (FIG. 2c). The effects are visible in the same way, even though the absolute carbon contents may vary somewhat.

Figure 2E:
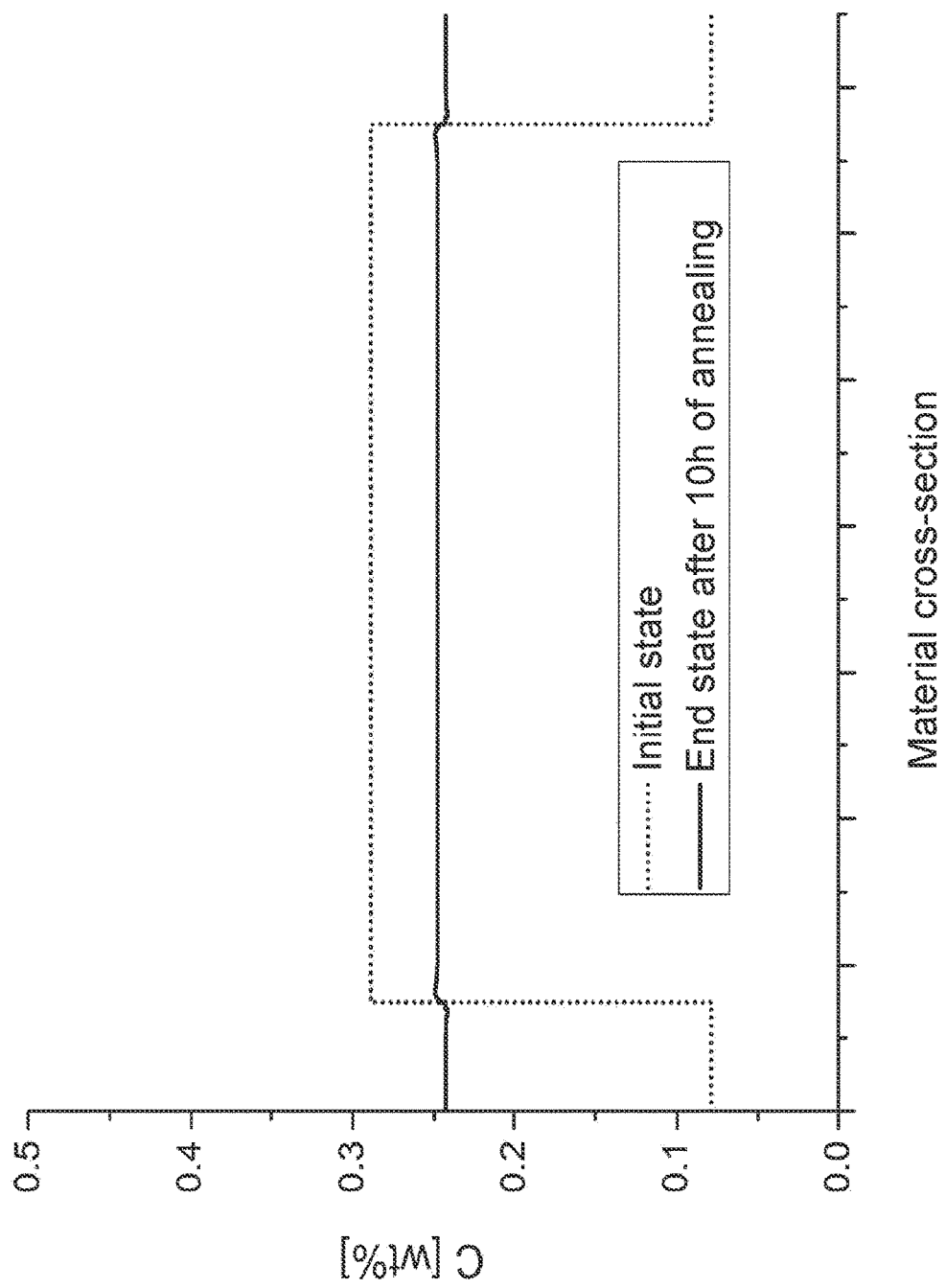
Figure 2I:
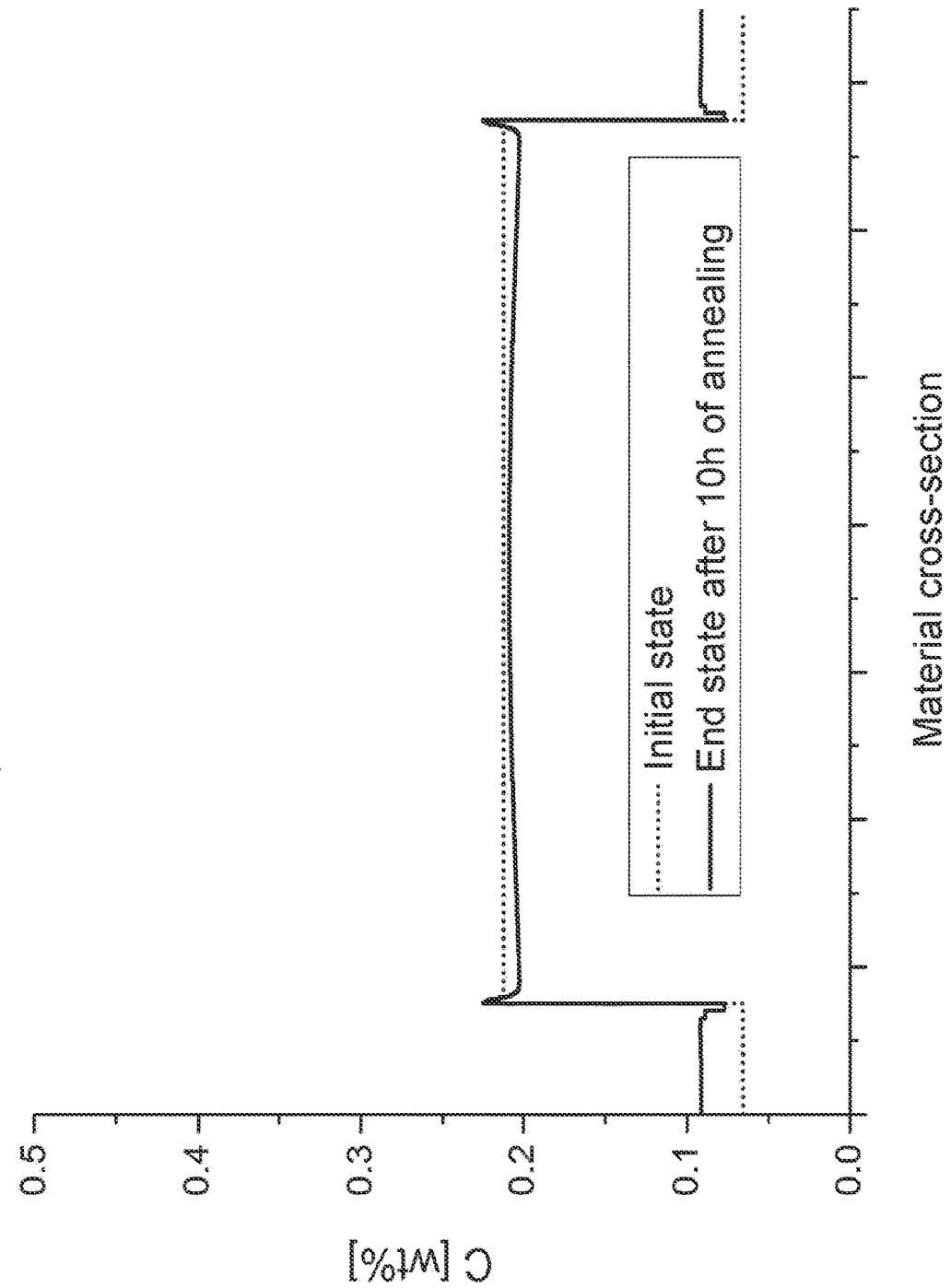
Figure 2L:
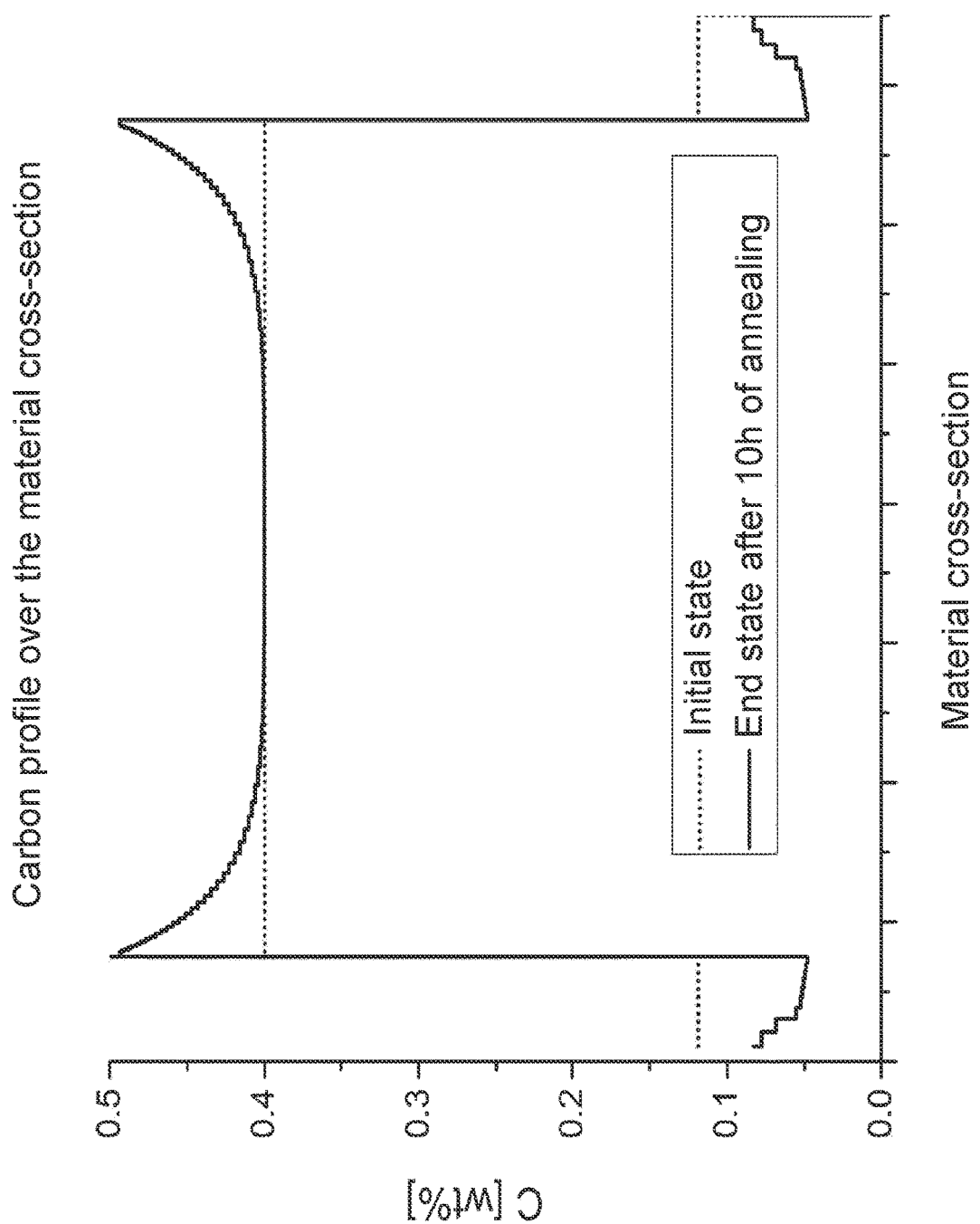
Figure 2N:
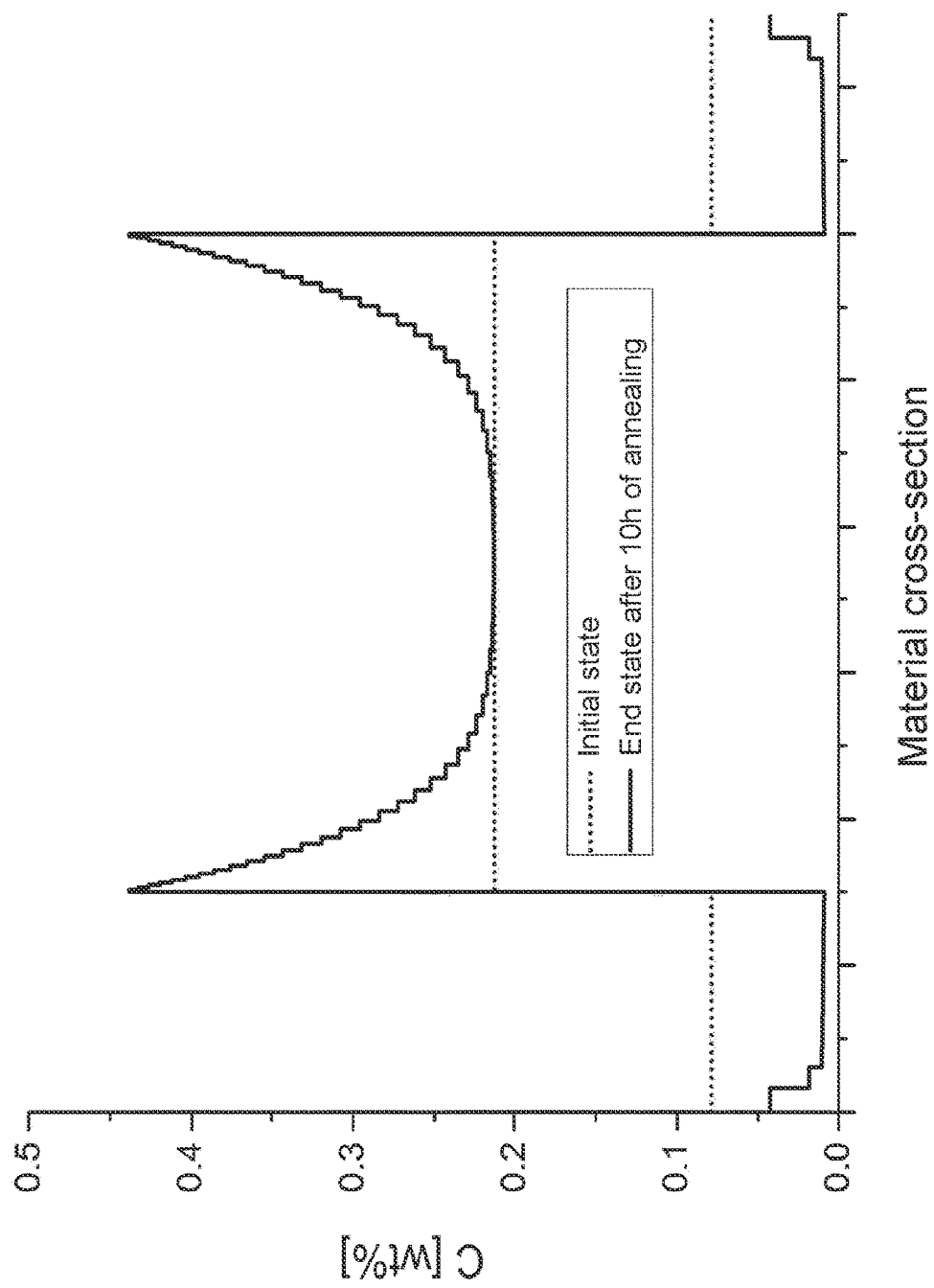
Figure 2P:
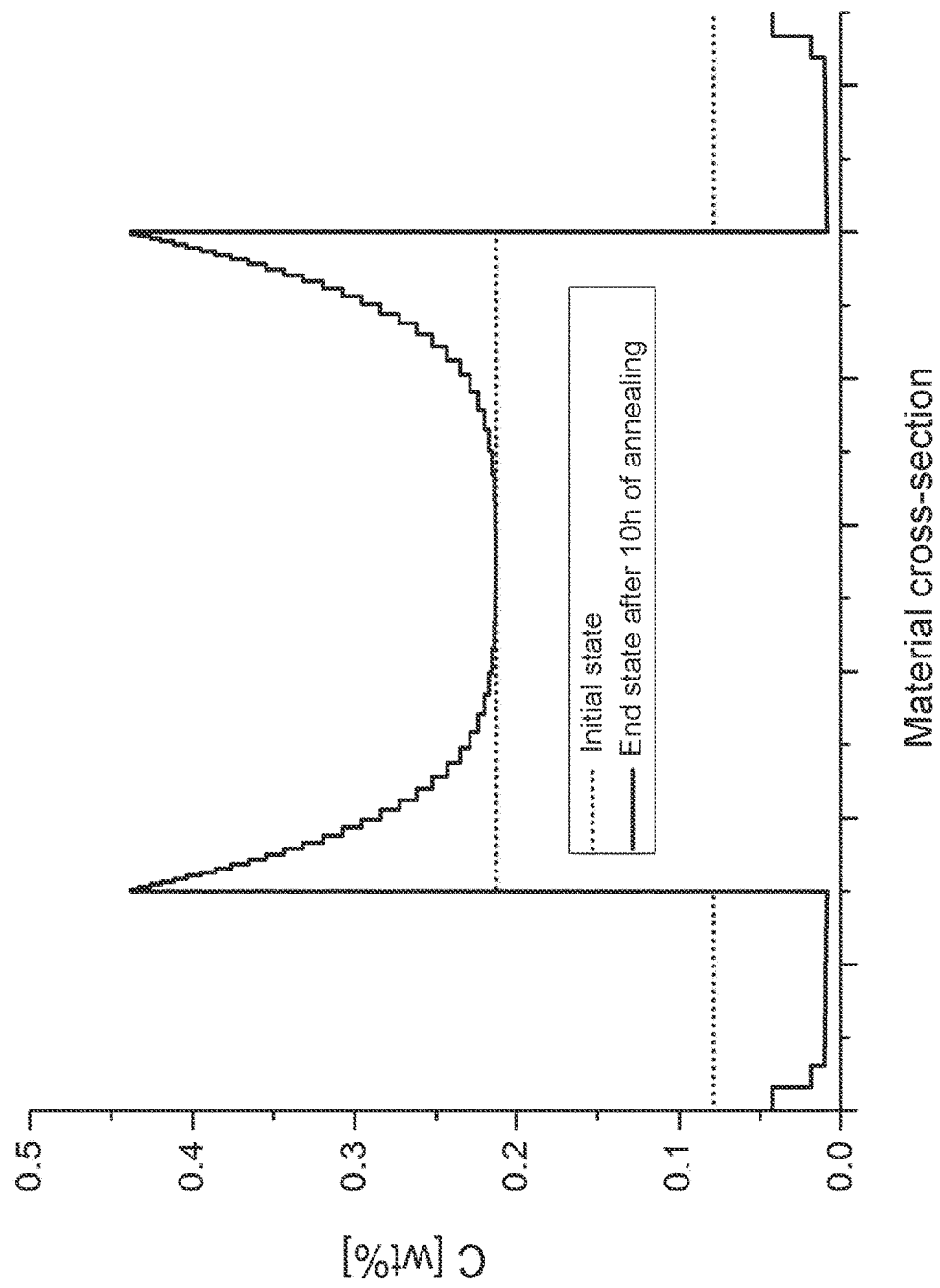

FIG. 2*d* shows an extreme case in which the chemical potential between the edge material 500LA and the core material 22MnB5 is not sufficient to achieve the effect according to the invention at the predetermined annealing temperature. This is even more extreme with the material pairing in FIG. 2E in which 340LA was used in the edge region and 29MnB6 was used in the core region and after the annealing, an equalization of the carbon content took place, i.e. the opposite of what is desired.

The effect according to the invention is also not achieved with the material pairing in FIG. 2*f*.

This is also true for the material pairing in FIGS. 2*g* and 2*h*, in which IF steels and boron-manganese steels have been combined and the desired effects do not occur.

With somewhat higher annealing temperatures and the material combination 500LA and 22MnB5, a carbon depletion of the carbon-richer material and an edge carburization even occur.

But if the chemical potential is widened again even further, for example with the use of 500LA in the edge region and 39MnCrB6-2, the effect according to the invention is once again achieved.

This is also true for the combination of 340LA with 22MnB5 and of 340 LA with 22MnB5 at an annealing temperature of 800 and 680° C., respectively.

FIG. 2O shows a material combination of 22MnB5 in the edge region and 340LA in the core region, i.e. a combination of hardenable steel on the outside and softer steel on the inside. Here, there is a clear carbon difference between the outer material and the inner material in the initial state (dotted line) and after 20 hours of annealing at 680° C. In this case, the central material is almost completely decarburized in the outer regions, while the carbon-richer material in the edge regions has been carburized to almost triple the value.

Figure 1:
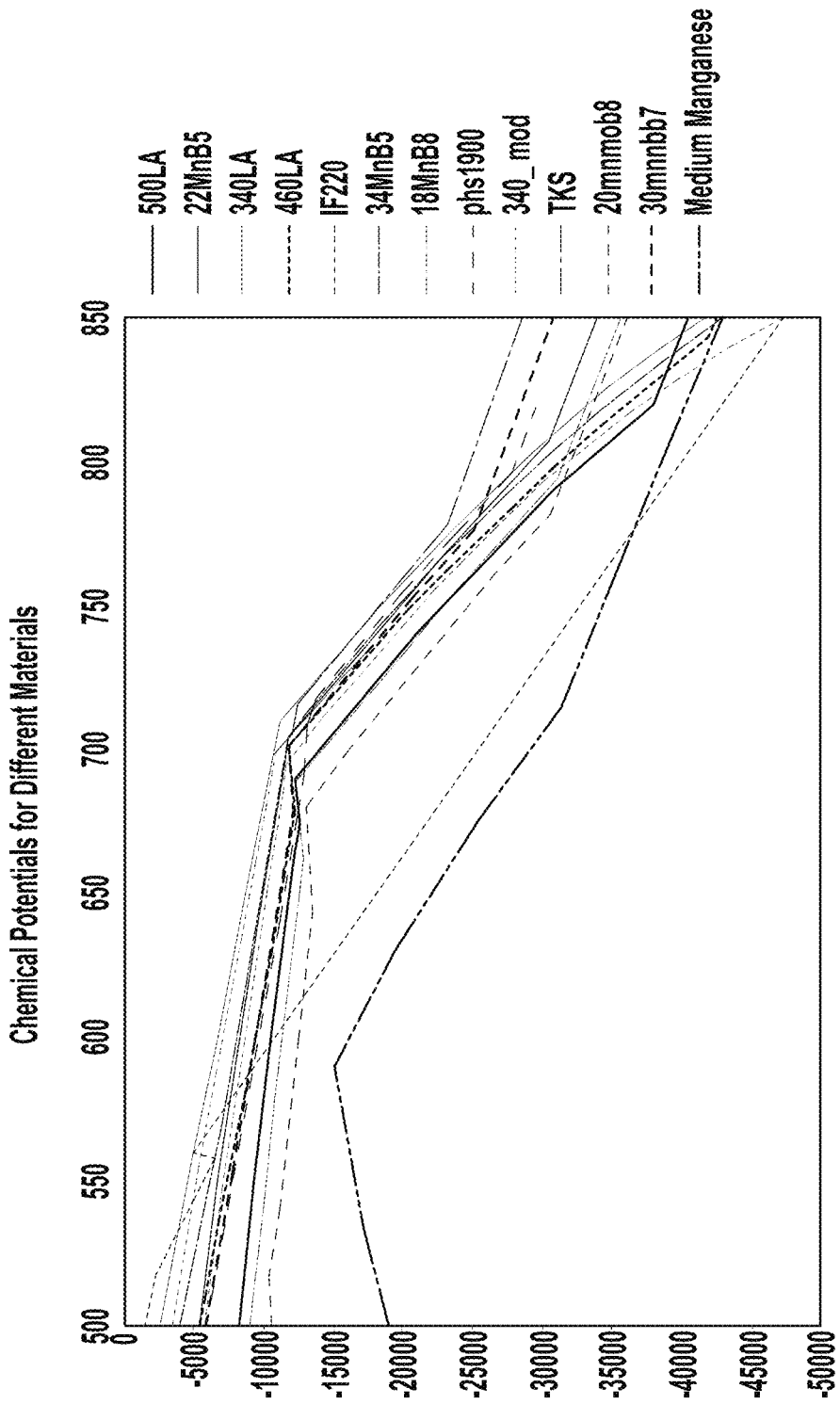
FIG. 1 shows the chemical potentials for different materials.

FIG. 1 shows the different chemical potentials for different materials and at different temperatures; in this case, it is clear that up to the corresponding annealing temperatures, a potential difference should be present and in particular, materials [sic] in which the potential decreases too sharply with increasing temperatures or crosses other lines is not suitable because it changes its potential properties so to speak during the annealing.

According to the invention, it is thus possible through a suitable materials selection and suitable annealing temperatures to further intensify the differences in carbon content between two adjoining steel materials so that by means of an uphill diffusion, it is possible to selectively influence the materials and as a result, a steel composite can be produced, which has very different properties.

The composite produced according to the invention can be press hardened or form hardened; the component produced in this way is in particular a body component for motor vehicles and in particular a structural component such as an A, B, or C pillar, a longitudinal member, a crossmember, or the like.

The invention claimed is:

1. A method for producing a steel composite characterized by:
   placing at least two steel sheets of different steel grades selected from material 1 and material 2 against each other in an alternating structure;
   hot rolling the steel sheets together, and optionally cold rolling, to create the steel composite; and
   diffusion annealing the steel composite at an annealing temperature of 650° C. to 720° C. wherein:
   the annealing temperature is below the minimum of Ac1 temperature of the material 1 and Ac1 temperature of the material 2;
   a chemical potential of the material 1 ($\mu_{C,\ material\ 1}$) and a chemical potential of the material 2 ($\mu_{C,\ material\ 2}$) at the annealing temperature correspond to the equation: $\mu_{C,\ material\ 1} > \mu_{C,\ material\ 2}$;
   material 1 has a lower carbon content than material 2, so that an uphill diffusion of carbon takes place between material 1 and material 2;
   material 1 has an alloy composition, in mass percent, of: carbon (C): 0.02-0.12, manganese (Mn): 0.2-1.2, aluminum (Al): 0.01-0.07, silicon (Si): <0.5, chromium (Cr): <0.3, titanium (Ti): 0.01-0.15, nitrogen (N): <0.02, boron (B): <0.02, phosphorus (P): <0.01, sulfur (S): <0.01, molybdenum (Mo): <1, and balance being iron and smelting impurities; and
   material 2 has an alloy composition, in mass percent, of: carbon (C): 0.08-0.6, manganese (Mn): 0.8-3.0, aluminum (Al): 0.01-0.07, silicon (Si): 0.01-0.5, chromium (Cr): 0.02-0.6, titanium (Ti): 0.01-0.08, nitrogen (N): <0.02, boron (B): 0.002-0.02, phosphorus (P): <0.01, sulfur (S): <0.01, molybdenum (Mo): <1, and balance being iron and smelting impurities.

2. The method according to claim 1, characterized by: a difference between the chemical potential of the material 1 ($\mu_{C,\ material\ 1}$) and the chemical potential of the material 2 ($\mu_{C,\ material\ 2}$) at the annealing temperature being greater than 500 J/mol.

3. The method according to claim 1, characterized by: the at least two steel sheets consisting of three steel sheets in an A-B-A structure or a B-A-B structure, wherein A represent steel sheet of steel grade material 1 and B represent steel sheet of steel grade material 2.

4. The method according to claim 3, characterized by: each of the two outer steel sheets in the A-B-A structure or the B-A-B structure making up at most-25% of the total thickness of the steel composite.

5. The method according to claim 1, characterized by: providing at least one side of the steel composite with a metallic coating selected from the group consisting of aluminum, an alloy containing essentially aluminum, an alloy composed of aluminum and zinc, a zinc alloy containing essentially zinc.

* * * * *